Feb. 21, 1967  C. WEIDAUER  3,304,596
WORKHOLDER FOR MACHINING PIVOT HOLES IN PINKING SHEARS
Filed Jan. 21, 1965  3 Sheets-Sheet 1
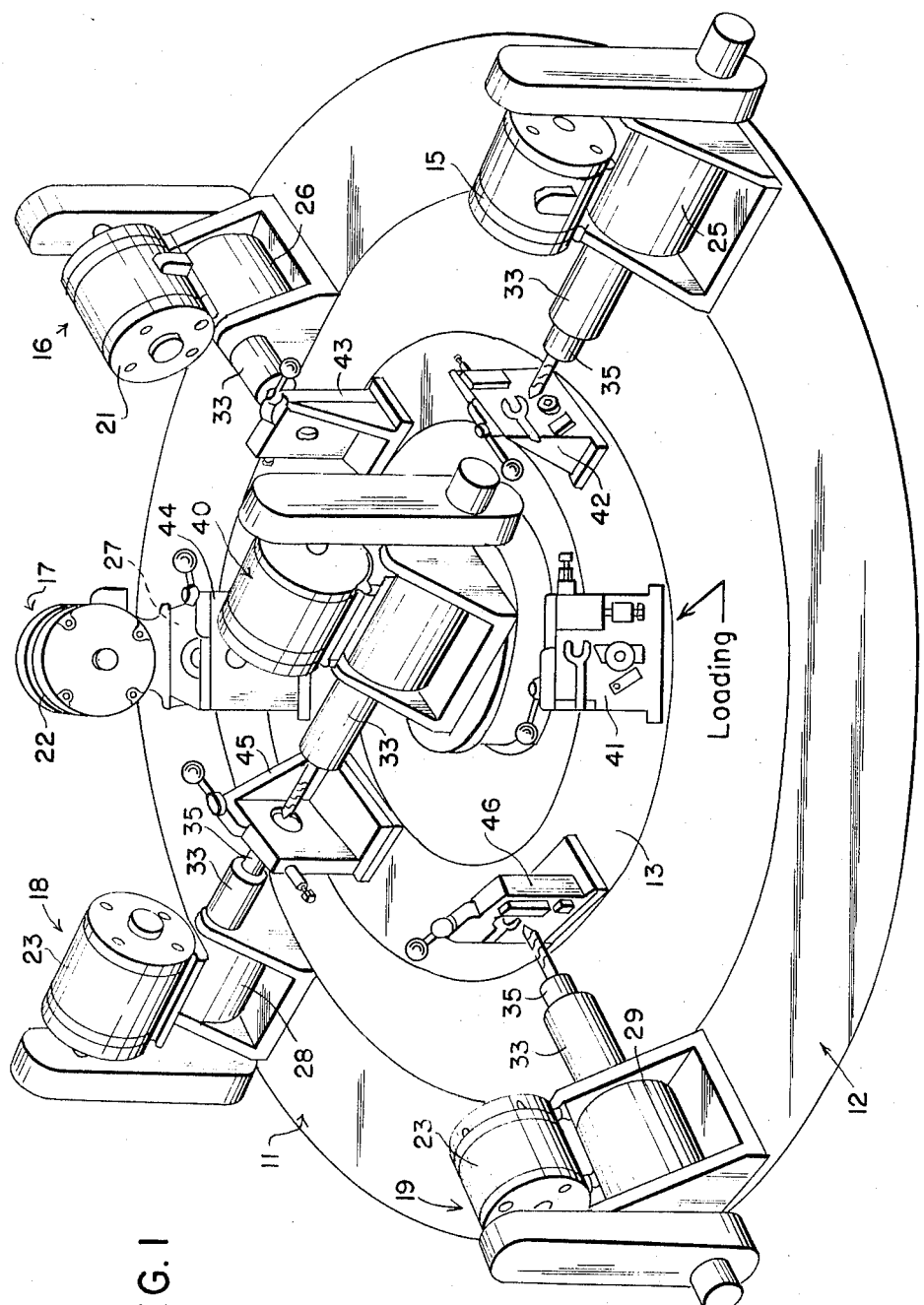
FIG. I
INVENTOR.
Curt Weidauer
by Sparrow and Sparrow
ATTORNEY Feb. 21, 1967 C. WEIDAUER 3,304,596
WORKHOLDER FOR MACHINING PIVOT HOLES IN PINKING SHEARS
Filed Jan. 21, 1965 3 Sheets-Sheet 2
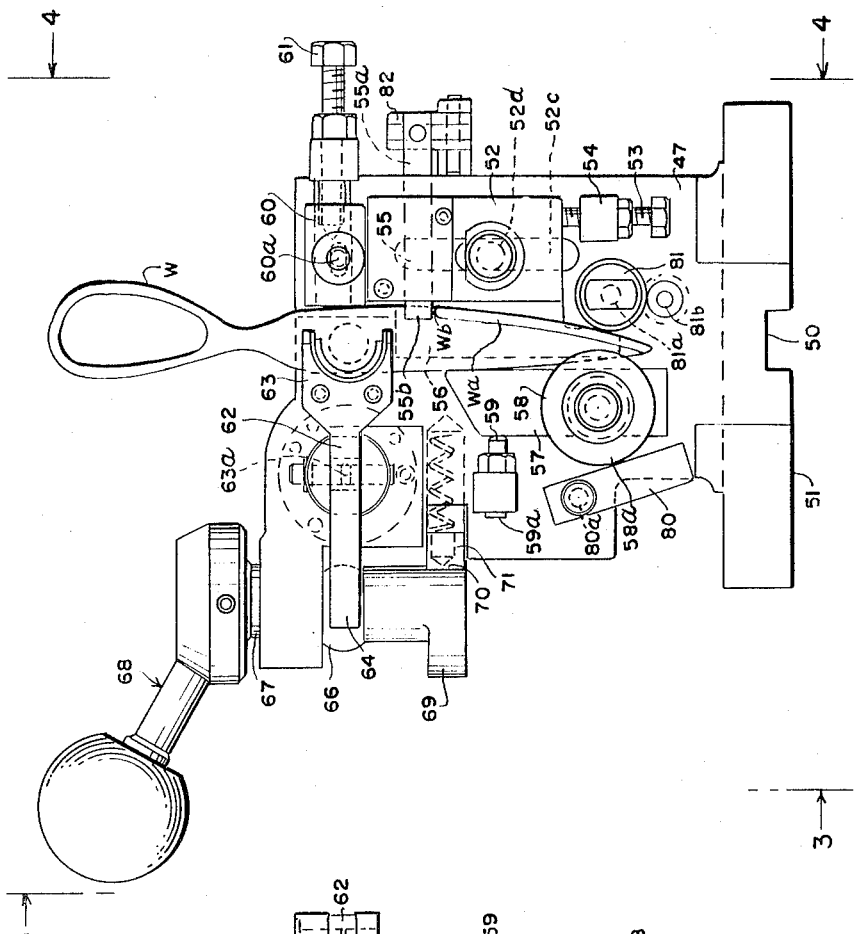
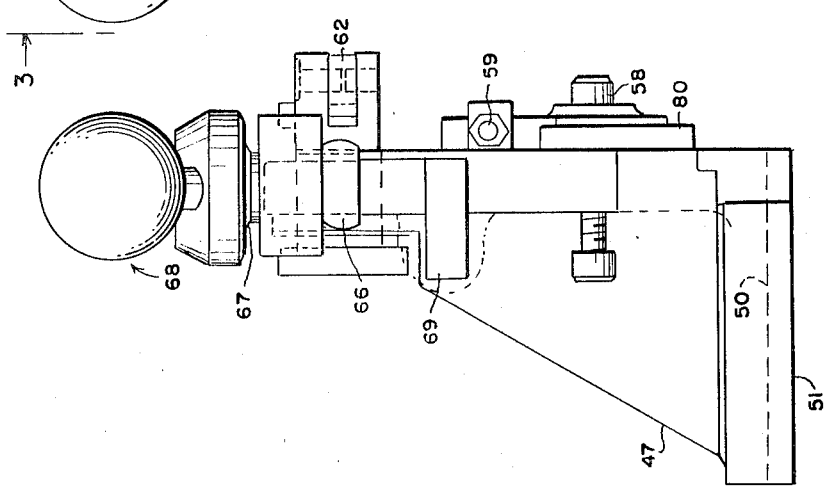
INVENTOR
Curt Weidauer
by SPARROW AND SPARROW
ATTORNEYS.

*INVENTOR.*
Curt Weidauer

*by*
SPARROW AND SPARROW
ATTORNEYS.

Ｕnited States Patent Office 3,304,596
Patented Feb. 21, 1967

3,304,596
WORKHOLDER FOR MACHINING PIVOT HOLES IN PINKING SHEARS
Curt Weidauer, Clinton Corners, N.Y., assignor to Samuel Briskman
Filed Jan. 21, 1965, Ser. No. 427,063
10 Claims. (Cl. 29—38)

This application is a continuation-in-part of my co-pending application Serial No. 214,637, filed August 3, 1962, now abandoned.

This invention relates to the manufacturing of shears having serrated or scalloped cutting edges, generally known as pinking shears, and more particularly to a workholder on which the unfinished shear blade, which may be in the form of a forging or casting, is mounted and clamped during the machining of the pivot hole therein.

The successful operation of pinking shears depends upon the precision with which the blades of these shears engage with one another at all points along the cutting edge. Obviously, this precise engaging motion depends upon the pivot about which the pair of shear blades relatively swings. It is, therefore, important that the pivot holes receiving the pivot be formed with precision.

Furthermore, the pivot is an important point of location for subsequent production steps or operations required to complete the formation of the pinking shear blades, such as described in my copending application Serial No. 214,603, filed August 3, 1962, now Patent No. 3,170,375, issued February 23, 1965, and Patent No. 3,130,521, granted April 28, 1964. The production of pivot holes in the blanks, castings or forgings from which the blades are formed, comprises several operations, which are combined in one machining device incorporating a workholder according to the present invention. The workholder consists in such novel features, construction arrangements and combinations of parts as shown and described in connection with the apparatus herein disclosed by way of example only and as ilustrative of a preferred embodiment.

Objects and advantages of the invention will be set forth in part hereafter and in part will be obvious herefrom or may be learned by practicing the invention, the same being realized and attained by means of the instrumentalities and combinations pointed out in the appended claims.

It is a general object of the present invention to provide a workholder for holding shear blade blanks, forgings or castings during multiple precision machining operations.

Another object of the present invention is to provide novel means for machining the pivot holes in the blades of pinking shears and the like.

A further object of the present invention is to provide a workholder fixture for clamping the unfinished shear blade or blank in a production machine during a complete cycle of operations.

Further and more specific purposes, features and advantages will clearly appear from the detailed description given below taken in connection with the accompanying drawings which form part of this specification and illustrate merely by way of example one embodiment of the device of the invention. In the following description and in the claims, parts will be identified by specific names for convenience, but such names are intended to be as generic in their application to similar parts as the art will permit. Like reference characters denote like parts in the several figures of the drawings.

FIG. 1 illustrates, schematically, an apparatus for machining pivot holes in unfinished shear blades showing workholder fixtures to which the unfinished shear blades are fixed;

FIG. 2 is a front elevation of a workholder fixture according to the invention showing a pinking shear blade casting or forging mounted and clamped in position thereon;

FIG. 3 is a side view of said workholder fixture, seen in the direction of the arrow 3—3;

Figure 5:
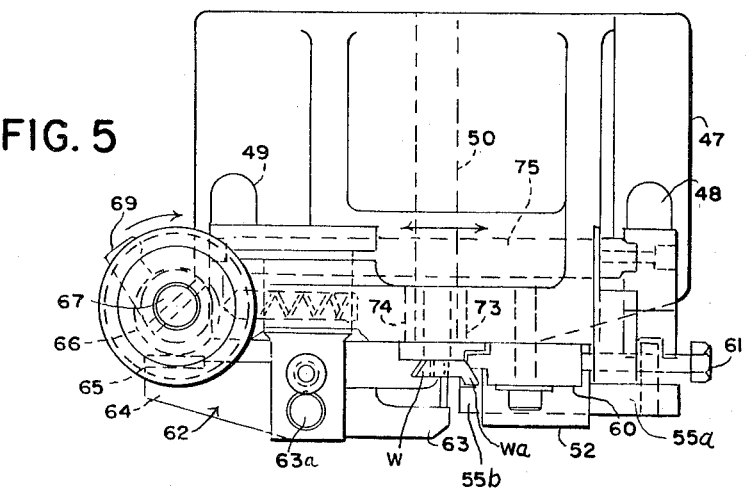
FIG. 5 is a plan view of FIG. 2 with shear blade and operating handle removed.
Figure 6:
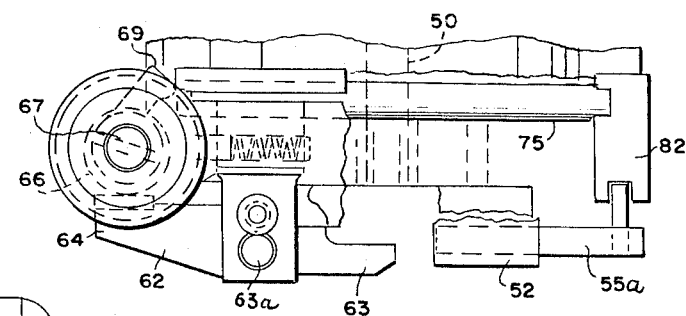
FIG. 6 is a view somewhat similar to FIG. 5 with parts broken away and key in retracted position.

Reference will now be made in more detail to the drawings. The workpiece W to be worked upon, which is an unfinished shear blade and which may be a casting or forging, has a longitudinal, usually slightly curved, lateral ridge Wa in which the teeth are later formed and finished by subsequent operations. There is shown in FIG. 1 an apparatus 11 having a base 12. Within the base 12 is arranged a horizontally rotatable platform or turntable 13 driven by an electric motor (not shown in the drawing). Turntable 13 is rotated by indexing in increments of 60 degrees in a timed continuous operation, as long as the master-switch relay (not shown in the drawing) is energized by operating a corresponding push-button located on a control panel (not shown). By way of example, there is shown in FIG. 1 six similar hand-operated workholder fixtures indicated by numerals 41, 42, 43, 44, 45 and 46, constructed according to the invention. These workholders are fixed to indexing turntable 13 adjacent its periphery and are spaced apart 60 degrees. On machine base 12, surrounding turntable 13, are disposed five substantially similar machine tool heads 15, 16, 17, 18 and 19, each of which preferably has its own electric motor drive, respectively, 20, 21, 22, 23 and 24. The tool heads 15, 16, 17, 18 and 19, respectively, are mounted on bases 25, 26, 27, 28 and 29 (partly not visible in the drawing), each of said bases containing a conventional tool spindle 33 provided with a conventional tool chuck 35, axially movable forward (operating stroke) and backward (retracting stroke) by conventional hydraulic motors (not shown in the drawing). A sixth machine tool head 40 having substantially the same structure and comprising similar parts as the tool heads 15, 16, 17, 18 and 19 is mounted in the non-rotating center portion of apparatus 11, such that it faces one of the tool heads which are mounted on the outside periphery of the turntable 13. The respective tool chucks 35 hold the tools which perform the various operations hereinafter described.

Figure 4:
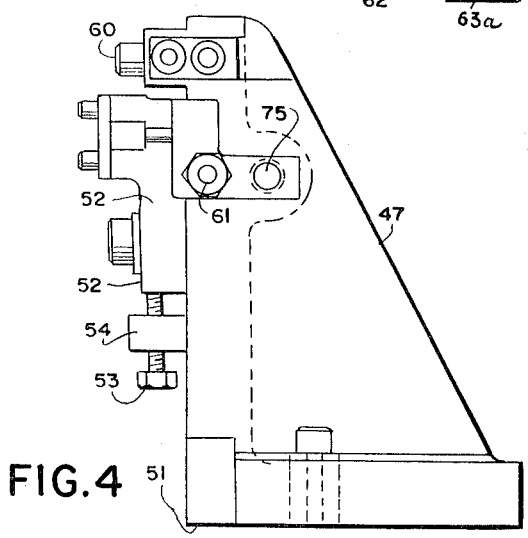
FIG. 4 is a side view of said workholder fixture, seen in the direction of the arrow 4—4.

Workholders 41, 42, 43, 44, 45 and 46 are of similar structure and, therefore, only one need be described. Referring to FIGS. 2, 3, 4 and 5, there is shown a substantially vertically disposed base or standard 47 having elongated boltholes 48, 49 and a precisely milled and ground longitudinally arranged key slot 50 in the bottom 51 thereof for adjusting the workholder fixture on the turntable with relation to the tool head.

Mounting and clamping means for the workpiece in the form of unfinished shear blade W to be drilled and countersunk, are arranged on the face of body or base 47, as hereinafter described. A vertical stop guide or slide 52 has a vertical guide slot 52c and is adjusted vertically by set screw 53 located in block 54 fixed to the base or standard 47. Projecting through slot 52c is a locking screw 52d operable to lock guide 52 in a desired vertical position. Guide or slide 52 has an elongated horizontal slot 55. A horizontally-disposed bar or key 55a is slidably disposed in said slot 55 and is adapted to project therefrom, as seen in FIG. 2, the projection being indicated at 55b for abutment with the end Wb of ridge Wa of blade W, when the latter is in located position as hereinafter described. A rest bar or strip 56 of preferably hardened steel is provided. Strip 56 is a replaceable wearplate which is attached to the base or standard 47 of the casting of the workholder.

Opposite key guide 52 and in spaced relation therewith is a lever or pivotal locator 57 which is pivotally held by means of flanged stop collar 58, lever 57 being urged sideways against shear blade W by a spring-loaded plunger 59, having an adjusting screw 59a. Thus, lever 57 presses again shear blade W under the influence of spring-loaded plunger 59 when the blade W is in working position. A fixed stop 80 limits pivotal movement of lever 57 in clockwise direction when the shear blade W is removed, stop 80 being locked to base or casting 47 by screw 80a. Flanged stop collar 58 is provided with a flange 58a to restrain shear blade W from forward movement during insertion. Blade W, when inserted, is located behind the flange 58a of collar 58. Attached to base or support 47 by means of a screw or stud 81a is a fixed stop, guide or locator 81. An auxiliary hole 81b is provided to which stop 81 is moved in the event a larger unfinished shear blade is to be worked upon. Above key guide 52 there is arranged a horizontally disposed contact member constituting an adjustable guide or locator 60 provided with a set screw 61 for making horizontal adjustment of locator 60, after which locator 60 is locked by screw 60a. Adjustable locator 60 is moved or slid horizontally by screw 61 and then fixed in position by screw 60a to facilitate location of unfinished shear blade W for centralizing the hole to be drilled in the latter to provide the pivot bore therein. Contact member or locator 60 (after being properly adjusted beforehand), fixed stop 81 and lever 57 provide a three-point locating position for unfinished shear blade W, and which together with projection 55b of key 55a, serve for the precise horizontal and vertical positioning of the shear blade W to prepare the latter for drilling its pivotal bore. A double-arm lever 62, which is pivotally mounted at 63a on the upper part of base 47, has at one end a bifurcated portion 63 by which the shear blade W is clamped against the rest bar or strip 56 by locking cam or eccentric disc 66 mounted on shaft 67 and bearing against hardened insert of portion 65 (FIG. 5), fixed to the other end 64 of lever arm 62. This insert or member 65 abuts against eccentric disc 66, which is mounted on a vertical shaft 67. Key 55a is connected to horizontal shaft 75 through a link or connecting member 82. Shaft 75 slidably operates within a longitudinal slot or opening located in the upper part of workholder casting 47 and is adapted to abut against eccentric or cam 69 mounted on vertical shaft 67. A handle 68, mounted on shaft 67, is adapted to operate lever 62 and thus, bifurcated clamp portion 63, as well as cam 69, and thus, key 55a. Cam 69 has a face 70 against which a spring-loaded plunger 71 is arranged for returning slide key 55a to its normal retracted position. A hole 73 is arranged in the upper part of base 47, opposite the bifurcated end 63 of clamp lever 62. A conventional shoulder drill bushing 74 is press-fitted into hole 73. The shoulder height of bushing 74 is equal to the height of rest plate 56, and thus, in alignment therewith providing with plate 56 a continuous flat locating surface for shear blade W.

In preparing the workholder for accurately locating a particular shear blade to be drilled for providing the pivot hole, the adjustable guides 52, 60 and stops 80, 81 are preset in accordance with the size and type of the unfinished shear blade and location of the pivot hole to be drilled therein. The shear blade thus will be located such that all consecutive operations in the machine will produce a precise pivotal bore at the exact place in the shear blade.

Prior to loading the workholder fixture, handle 68 is in extreme clockwise position. This is the position used to load the workholder with an unfinished shear blade W. Key 55a, with its forward end portion 55b, is in retracted position and clamping lever 62 is in open position. Shear blade W is inserted in the space provided therefor in the workholder against bushing 74 and rest plate 56 with its forward portion located between fixed stop guide or locator 81 and pivoted guide lever or locator 57, and its upper portion abutting against guide or locator 60. Lever 57, which is urged against the shear blade W by spring-loaded plunger 59, holds blade W against stop 81 and guide 60. Handle 68, secured to shaft 67, is now rotated in counterclockwise direction until projection 55b of key 55a engages the inner face of shear blade W above ridge Wa. Blade W is then moved vertically until its shoulder Wb abuts projection 55b, which thus provides the vertical locating point for the blade W. Further rotation of handle 68 in the same counterclockwise direction will cause cam 66 to bear against end portion 64 of lever 62 and thus cause bifurcated portion 63 of lever 62 to clamp shear blade W against wear-plate 56 and shoulder bushing 74. These two steps are performed with one hand of the operator without relinquishing his grip on handle 68, and are accomplished sequentially: (1) by cam 69 first engaging and then sliding shaft 75, the latter by means of link or connecting member 82, transferring its motion to key 55a, thus causing it to slide forwardly and project its end portion 55b over the front face of unfinished shear blade W; and then (2) by cam 66 engaging end portion 64 of lever 62 by which bifurcated portion 63 of lever 62 thus is caused to move inwardly to clamp shear blade W rigidly in position against wearplate 56 and bushing 74. The shear blade is now ready for the required operations to provide the pivot hole therein. The above operations are performed at the loading station indicated in FIG. 1 of the drawing.

When turntable 13 subsequently indexes, all six required machining operations on the unfinished shear blade W are made in consecutive order. Thus, sequential operations are done simultaneously on six shear blades secured to the six workholders so that there will be one finished shear blade produced for each index of 60 degrees. The machine is equipped to operate automatically. The six operations required to form a completed pivot hole are: drilling (19), countersinging the drilled hole from both sides of the blade in a simultaneous operation of heads (18) and (40), then first reaming of the hole (17), spot-facing the blade (16) and finish-reaming the hole (15) for the required very close tolerance which is essential for the functioning of the pinking shears.

After completion of a cycle of operations, the workholder, which has a shear blade W, with its completely drilled, countersunk and reamed pivot hole, now reaches the loading station. At this point, during the dwell of the indexing cycle, handle 68 is turned in clockwise direction, thus releasing clamping lever 62 from the shear blade and permitting key 55a, under the influence of cam 69, to be retracted and its forward end 55b thus retracted from shear blade W. The drilled blade is now removed from the workholder and another unfinished blade is inserted and the operations are repeated as heretofore described.

The workholder, according to the invention, for simplicity or ease of loading blade W, makes it possible to machine the pivot holes in the shear blades with the required degree of precision without the necessity of resetting the blade so that all subsequent operations will guarantee the interchangeability of the blades for the assembly prior to the final honing and lapping procedure. The workholder is designed for easy, efficient and speedy loading and unloading of blade W.

While the invention has been described and illustrated with respect to a preferred example which gives satisfactory results, it will be understood by those skilled in the art after understanding the principle of the invention, that various other changes and modifications may be made without departing from the spirit and scope of the invention and it is intended therefore in the appended claims to cover all such changes and modifications.

I claim:
1. A workholder adapted to be fixed to an indexing turntable for holding an unfinished pinking shear blade during multiple machining operations to provide a pivot hole in said blade, said blade having a substantially longitudinal ridge adjacent an end thereof to provide teeth by subsequent machining operations, said workholder comprising a vertical standard, means to locate said blade in a vertical position, said means comprising two guide means at the lower portion of said standard to receive therebetween the forward portion of said blade and an adjustably mounted contact member at the upper portion of said standard against which the said end of said blade above said ridge may abut, one of said guide means being pivoted, and the other of said guide means being fixed, resilient means to urge at least a portion of said pivoted guide means against said blade when inserted between said guide means, means to horizontally adjust said contact member, a guide adjustably mounted on said standard below said contact member, means to adjust said guide vertically, said guide having a horizontal guide slot, a key member slidable in said slot, means to slide said key member, said key member when slidable to a forward operable position being adapted to extend over said blade above said ridge when said blade is inserted between said guide means, resilient means to return said key member from said forward position, means to clamp said blade against said standard after said blade is inserted between said guides and against said contact member with said ridge of said blade against the extended portion of said key member, said means to slide said key member to forward portion and said means to clamp said blade comprising cam means, connecting means between said cam means and said slide means and between said cam means and said clamp means, and rotatable means to operate said cam means, said cam means being disposed with relation to said rotatable means whereby upon rotation of the latter in one direction, said slide connecting means will cause said key member to first extend over said blade and then cause said blade to be clamped against said standard by said clamp means.

2. A workholder according to claim 1, and manually operable means for rotating said rotable means.

3. A workholder adapted to be fixed to an indexing turntable for holding an unfinished pinking shear blade during multiple machining operations to provide a pivot hole in said blade, said blade having a substantially longitudinal ridge adjacent an end thereof to provide teeth by subsequent machining operations, said workholder comprising a vertical support, means to locate said blade in a vertical position on said support, said means comprising two guide means at the lower portion of said support to receive therebetween the forward portion of said blade and a contact member adjustably mounted at the upper portion of said support against which the said end of said blade above said ridge may be made to abut, one of said guide means being pivoted, and the other of said guide means being fixed, resilient means to urge at least a portion of said pivoted buide means against said blade when inserted between said guide means, means to horizontally adjust said contact member, a guide adjustably mounted on said standard below said contact member, means to adjust said guide vertically, said guide having a horizontal guide slot, a key member slidable in said slot, means to slide said key member, said key member when slidable to a forward operable position being adapted to extend over said blade above said ridge when said blade is inserted between said guide means, means to clamp said blade against said support after said blade is inserted between said guides and against said contact member, a first cam means, connecting means between said first cam means and said slide means, a second cam means, connecting means between said second cam means and said clamp means, and means for actuating said first cam means and said second cam means in sequence.

4. A workholder according to claim 3, and means to return said key member to inoperable position upon reverse rotation of said rotatable means.

5. A workholder according to claim 3, and resilient means to return said key member to inoperable position upon reverse rotation of said rotatable means.

6. A workholder according to claim 3, comprising manually operable means for rotating said rotatable means, and resilient means to return said key member to inoperable position upon reverse rotation of said rotatable means.

7. A workholder according to claim 3, and rotatable means for actuating both said cam means.

8. A workholder according to claim 3, comprising rotatable means for actuating both said cam means, and manually operable means for said rotatable means.

9. A workholder adapted to be fixed to an indexing turntable for holding an unfinished pinking shear blade during multiple machining operations to provide a pivot hole in said blade, said workholder comprising a vertically disposed support, means on said support for locating said blade in a vertical position for said machining of said pivot hole, said means constituting guides for positioning said blade, independently settable adjusting means for at least one of said guides, a horizontally slidable member having a forward portion adapted to engage said blade when held by said guide means after said slidable member is projected, horizontally disposed lever means for holding said blade against said support for a machining operation, means for operating said slidable member to a position whereby said forward portion will engage said blade, means for operating said lever, and rotatable means for operating said slidable member operating means and for operating said lever operating means in sequence.

10. A workholder according to claim 9, and resilient means for returning said slidable member to a retracted position.

References Cited by the Examiner
UNITED STATES PATENTS 1,849,683  3/1932  Millholland _____ 29—38.3
2,073,111  3/1937  Lindgren _____ 29—38.3

RICHARD H. EANES, Jr., *Primary Examiner.*